Nov. 9, 1971  E. SCHMEJA ET AL  3,618,198
ASSEMBLY OF INTERFITTING ELEMENTS INCLUDING
AT LEAST ONE HARD-TO-MACHINE PART
Filed May 13, 1969

INVENTORS
EWALD SCHMEJA
WALTER GLOMP
BY Karl F. Ross
ATTORNEY

United States Patent Office 3,618,198
Patented Nov. 9, 1971

3,618,198
ASSEMBLY OF INTERFITTING ELEMENTS INCLUDING AT LEAST ONE HARD-TO-MACHINE PART
Ewald Schmeja, Dachau, and Walter Glomp, Lochham, Germany, assignors to Krauss-Maffei Aktiengesellschaft, Munich-Allach, Germany
Filed May 13, 1969, Ser. No. 824,088
Claims priority, application Germany, May 16, 1968, P 17 50 593.0
Int. Cl. B23p 3/00, 25/00
U.S. Cl. 29—458
4 Claims

ABSTRACT OF THE DISCLOSURE

A hard-to-machine part, such as a cast liner for the housing of a grinding mill, is provided with an adhering layer of moldable polymeric material forming a smooth contact surface to bear upon a coacting surface of a supporting member, such as a mill housing.

---

Our present invention relates to an assembly in which several elements, including one or more hard-to-machine parts, are to be fitted together or mounted next to each other with close tolerances.

In many instances it is necessary to provide a base, housing or other structural element with a facing or liner of refractory metal or ceramic material designed to withstand impact or other stresses which a more easily machinable part would be incapable of sustaining. A typical example of such an assembly is the housing of a grinding mill having an inner wall surface provided with corrugations, serrations or similar formations serving for the comminution of solid particles. Such inner wall surfaces are generally part of a separate insert or liner which can be readily replaced when worn and which is conveniently formed by chill casting.

Since case-hardened metal castings and other refractory bodies cannot be readily machined for a close fit against a seating surfaces, it has heretofore been the practice to provide the contact surfaces of such bodies with a machinable metal coating, e.g. by sputtering or arc welding, and to subject the coated body to a chip removing surface treatment. This procedure is time-consuming and expensive.

The general object of our present invention is to provide an alternate, simpler and less expensive technique for assembling such refractory parts onto a supporting element forming a seating surface therefor.

A more particular object of our invention is to provide a method of furnishing refractory parts, without any chip-removing surface treatment, with a smooth contact surface in an accurately reproducible manner conducive to the mass production of such parts to the required tolerances.

These objects are realized, pursuant to our present invention, by an initial formation (preferably by casting) of a refractory part with a thickness smaller than its design thickness in the final assembly, followed by the coating of a side of this part with a polymeric layer whose thickness complements that of the original part to the aforementioned design thickness; the exposed surface of the polymeric layer is then brought into contact with the correspondingly shaped seating surface of the supporting element of the assembly.

The thickness of the polymeric layer will generally be a small fraction of the wall thickness of either of the two assembly elements between which the layer is to be sandwiched. Suitable polymeric materials include both natural rubber and synthetic resins of an elastomeric or nonelastomeric nature, the choice depending on operating temperature and other conditions of use. Polystyrene, polyethylene and phenolic resins, all readily moldable, may be mentioned by way of example.

According to a more specific aspect of our invention, the undersized casting is placed in a mold whose cavity is so dimensioned as to leave a clearance of a width slightly exceeding the desired thickness of the polymeric layer in the final assembly, thereby allowing for shrinkage of that layer to its proper dimension upon cooling. It will usually suffice to make the layer thickness only a little greater than the maximum depth of the surface irregularities of the casting so as to provide a continuous film; the thinner that film, of course, the less the extra space that must be allowed for shrinkage.

The invention will be described in greater detail with reference to the accompanying drawing in which.

Figure 1:
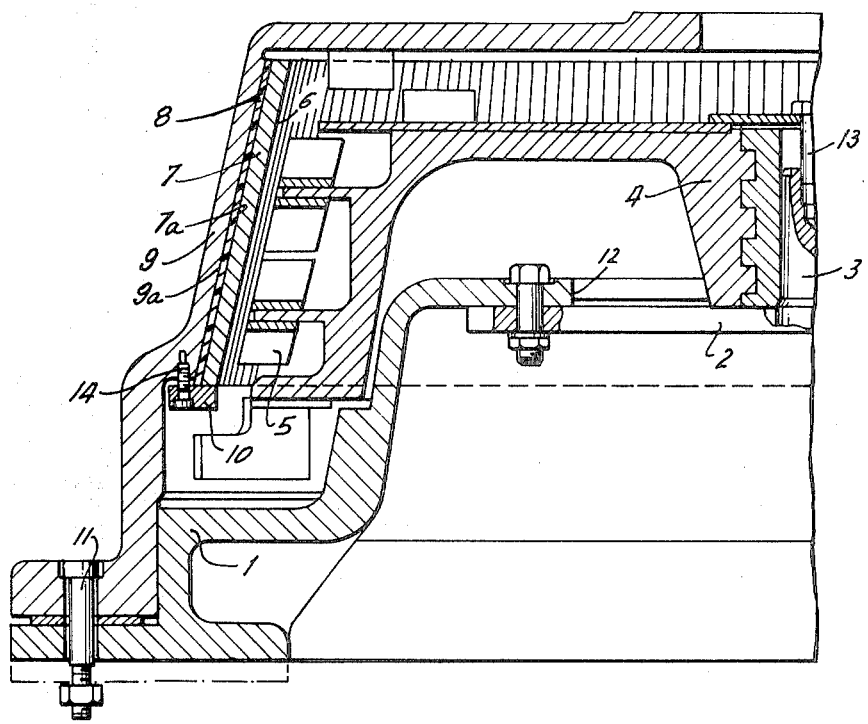
FIG. 1 is an axial sectional view of one half of a grinding mill with a housing and liner assembled in accordance with our invention.

In FIG. 1 we have shown a grinding mill with a stationary base 1 having a central opening 12 spanned by a carrier plate 2. A central boss 3, rigid with plate 2, rotatably supports a stub shaft 13 of a rotor 4 which can be set in motion about the shaft axis by a drive mechanism not shown. The outer surface of rotor 4 carries a set of teeth or vanes 5 coacting with corrugations 6 on the confronting inner surface of a refractory insert 7 which forms a liner for a frustoconical housing 9 surrounding the rotor. Housing 9 is secured by screws 11 to the base 1.

In accordance with our present invention, the frustoconical liner 7 is receivable with slight clearance in housing 9 and is coated on its rough outer surface 7a with a polymeric layer 8 as described above. This layer forms a contact surface coming to rest against the inner surface 9a of housing 9 as the liner 7 is clamped in place by a retaining ring 10 with the aid of screws 14.

Figure 2:
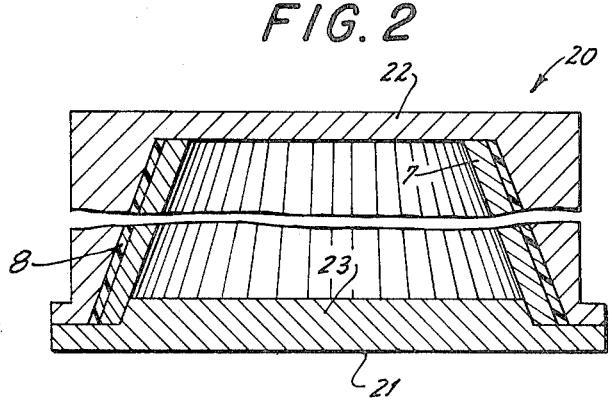
FIG. 2 is a cross-sectional view of a mold for making the liner of FIG. 1.

FIG. 2 illustrates how the liner 7, after casting in a chill mold, can be provided with its polymeric layer 8 by being introduced into an injection or compression mold 20 consisting of two halves 21, 22. Mold half 21 has a raised platform 23 which centers the body 7 so as to leave only a slight all-around clearance within the mold cavity for the formation of layer 8. After cooling and shrinkage, the compound body 7, 8 has the proper external and internal dimensions for fitting into the shell 9 of FIG. 1.

Figure 3:
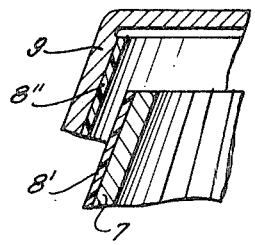
FIG. 3 is a fragmentary cross-sectional view of an assembly similar to that of FIG. 1 in a partly separated position.

If desired, the principles described above may be extended to include the provision of a similar layer on the seating surface of the receiving assembly element, i.e. on the inner surface of shell 9 in the specific embodiment of FIG. 1. This has been illustrated in FIG. 3 where the two parts 7, 9 are respectively provided with an outer layer 8' and an inner layer 8" of the same or compatible polymeric materials.

Generally, the coated body can be assembled onto its support without further treatment of its contact surface. Naturally, the cast part 7 could be subjected to a preliminary grinding operation to remove particularly obtrusive rough spots before the layer 8 (or 8') is molded onto it.

We claim:

1. A method of providing a closely fitting assembly of several coaxial elements including at least one hard-to-machine part and a support forming a seating surface for said part, comprising the steps of casting said part from refractory material with a rough surface centered on an axis with a thickness transverse to said axis smaller than its design thickness in the final assembly, providing a contact surface on the part so formed by coating said rough surface thereof with a polymeric layer of a thickness sufficient to cover the rough spots thereof while complementing the thickness of said part to said design thickness, and fitting said elements together with said contact surface centered on said axis and resting against said seating surface.

2. A method as defined in claim 1 wherein said polymeric layer is molded onto said part.

3. A method as defined in claim 2 wherein the molding of said layer is carried out in a mold cavity having a clearance of a width slightly exceeding the thickness of said layer in the final assembly, said layer being thereupon allowed to shrink to its final thickness.

4. A method as defined in claim 3 wherein said part is cast from metal and is introduced into said mold cavity without chip-removing surface treatment.

References Cited

UNITED STATES PATENTS

| | | | |
|---|---|---|---|
| 3,054,333 | 9/1962 | Brainard | 74—826 |
| 3,091,133 | 5/1963 | Hoeger | 74—826 |
| 3,213,722 | 10/1965 | Maglica | 74—826 |

JOHN F. CAMPBELL, Primary Examiner

D. P. ROONEY, Assistant Examiner

U.S. Cl. X.R.

74—823, 826